United States Patent
Murayama et al.

(10) Patent No.: US 11,181,469 B2
(45) Date of Patent: Nov. 23, 2021

(54) SPECTROSCOPIC ANALYSIS DEVICE

(71) Applicant: Yokogawa Electric Corporation, Tokyo (JP)

(72) Inventors: Kodai Murayama, Tokyo (JP); Atsushi Ito, Tokyo (JP); Fumie Watanabe, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/770,219

(22) PCT Filed: Nov. 29, 2018

(86) PCT No.: PCT/JP2018/044026
§ 371 (c)(1),
(2) Date: Jun. 5, 2020

(87) PCT Pub. No.: WO2019/111800
PCT Pub. Date: Jun. 13, 2019

(65) Prior Publication Data
US 2021/0190676 A1 Jun. 24, 2021

(30) Foreign Application Priority Data

Dec. 7, 2017 (JP) .............................. JP2017-235520

(51) Int. Cl.
*G01N 21/19* (2006.01)
*G01J 3/28* (2006.01)
*G01J 3/447* (2006.01)

(52) U.S. Cl.
CPC ............ *G01N 21/19* (2013.01); *G01J 3/2823* (2013.01); *G01J 3/447* (2013.01)

(58) Field of Classification Search
CPC ............................................. G01J 2003/1208
See application file for complete search history.

(56) References Cited

U.S. PATENT DOCUMENTS 3,674,350 A * 7/1972 Staiger ................. G03B 21/115
353/27 R
2002/0122246 A1* 9/2002 Tearney ................ G01J 3/0291
359/368

(Continued)

FOREIGN PATENT DOCUMENTS

FR        1557256 A       2/1969
WO   2008142723 A2     11/2008
WO   2016/031567 A1     3/2016

OTHER PUBLICATIONS

Clementina Provenzano et al., "Method for artifact-free circular dichroism measurements based on polarization grating", Optics Letters, Jun. 1, 2010, pp. 1822-1824, vol. 35, No. 11.

*Primary Examiner* — Shawn Decenzo
(74) *Attorney, Agent, or Firm* — Sughrue Mion, PLLC

(57) ABSTRACT

A spectroscopic analysis device includes a light source configured to emit light including a plurality of wavelength components, a polarizer configured to convert the light emitted from the light source to a light of linearly polarized light to be radiated to a sample, a polarizing diffraction element configured to diffract and spectrally disperse a first polarization component included in the light having passed through the sample in a first direction, the polarizing diffraction element being configured to diffract and spectrally disperse a second polarization component included in the light in a second direction different from the first direction, a prism which is disposed on an exit side of the polarizing diffraction element and which has a first exit surface crossing the first direction and a second exit surface crossing the second direction, and in which angles of the first exit surface and the second exit surface with respect to a reference plane including the first direction and the second direction are different, an imaging element configured to capture an image of the first polarization component emitted from the first exit (Continued)

surface of the prism and an image of the second polarization component emitted from the second exit surface, and a processor configured to analyze the sample based on an imaging result of the imaging element.

20 Claims, 8 Drawing Sheets

(56) References Cited

U.S. PATENT DOCUMENTS

| | | | |
|---|---|---|---|
| 2009/0034077 A1* | 2/2009 | Kane | G02B 5/1814 |
| | | | 359/566 |
| 2009/0040521 A1* | 2/2009 | Hu | G01J 3/14 |
| | | | 356/328 |
| 2014/0078298 A1* | 3/2014 | Kudenov | G01J 3/0208 |
| | | | 348/135 |
| 2015/0316476 A1* | 11/2015 | Acher | G02B 27/283 |
| | | | 250/458.1 |
| 2016/0282180 A1* | 9/2016 | Hu | G01J 3/28 |
| 2017/0153373 A1* | 6/2017 | Divliansky | G02B 27/1086 |
| 2017/0205632 A1* | 7/2017 | Zhou | G02B 5/1814 |
| 2017/0276597 A1* | 9/2017 | Emoto | G01N 21/23 |
| 2021/0191110 A1* | 6/2021 | Holler | G02B 26/108 |

* cited by examiner

SPECTROSCOPIC ANALYSIS DEVICE

CROSS REFERENCE TO RELATED APPLICATIONS

This application is a National Stage of International Application No. PCT/JP2018/044026 filed Nov. 29, 2018, claiming priority based on Japanese Patent Application No. 2017-235520, filed Dec. 7, 2017, the entire contents of each of which are herein incorporated by reference in their entireties.

TECHNICAL FIELD

The present invention relates to a spectroscopic analysis device.

BACKGROUND ART

Chirality (optical activity) of a specific molecule has a circular dichroism in which counter-clockwise circularly polarized light and clockwise circularly polarized light have different absorptivities. Generally, a circular dichroism spectrometer is used for analyzing optical activity of a chiral molecule having chirality. A circular dichroism spectrometer measures an absorptivity of light incident from a light source on a sample while converting the incident light to clockwise circularly polarized light and counter-clockwise circularly polarized light using a photo-elastic modulator. A circular dichroism spectrum is obtained by taking the ratio of the measured absorptivities. In this method, clockwise circularly polarized light and counter-clockwise circularly polarized light each need to be measured twice, which causes the synchronization to be lost and decreases the measurement speed.

Therefore, a method in which white light is emitted to a sample, light having passed through the sample is separated and spectrally dispersed into counter-clockwise circularly polarized light and clockwise circularly polarized light by a polarizing diffraction grating, the separated and spectrally dispersed counter-clockwise circularly polarized light and clockwise circularly polarized light are imaged by two imaging elements, and the structure of the sample is analyzed based on a phase difference between the imaged signals has been proposed. Since, depending on the molecular structure of a sample, the absorptivities of a clockwise circularly polarized light component and a counter-clockwise circularly polarized light component are different, the clockwise circularly polarized light component and the counter-clockwise circularly polarized light component having passed through the sample are separated, and a difference between these signals is taken to analyze the molecular structure of the sample (for example, see Non-Patent Literature 1).

In a birefringence measuring device, linearly polarized light is created from a light beam emitted from a light source, the linearly polarized light is expanded by a beam expander, clockwise circularly polarized light is generated from the expanded linearly polarized light by a quarter-wavelength plate, and a beam of the generated circularly polarized light is radiated to a sample. In the birefringence measuring device, a plurality of polarizing diffraction elements for generating diffracted light are arranged in an imaging optical system that images light having passed through the sample, and a contrast pattern of—1st-order diffracted light generated by the polarizing diffraction elements is imaged by an imaging element. In the birefringence measuring device, information related to a phase difference between an abnormal light component and a normal light component in the transmission light (emission light) with reference to circularly polarized light (incident light), calculated based on the imaged contrast pattern is displayed on a display. The polarizing diffraction element is a form birefringence polarizing diffraction grating formed by aligning a plurality of grating units in a transparent resin liquid, and four patterns of gratings are formed (for example, see Patent Literature 1).

CITATION LIST

Patent Literature

[Patent Literature 1]
International Patent Publication No. 2016/031567

Non-Patent Literature

[Non-Patent Literature 1]
"Method for artifact-free circular dichroism measurements based on polarization grating," Clementina Provenzano, Pasquale Pagliusi, Alfredo Mazzulla, and Gabriella Cipparrone, Optics Letters Vol. 35, Issue 11, pp. 1822-1824, 2010

SUMMARY OF INVENTION

Technical Problem

However, the birefringence measuring device of the conventional technique has a polarizing diffraction grating having a structure having a continuous orientation distribution. Therefore, in the conventional technique, since the grating width increases and the number of diffraction gratings is limited, it is not possible to increase the number of diffraction gratings. As described above, in the conventional technique, since it is not possible to increase the number of diffraction gratings, the spectral dispersion ability is low. As a result, in the conventional technique, there is a problem that it is not possible to enhance wavelength resolution.

Moreover, the conventional technique has a problem that the size of the spectroscopic analysis device is large. Specifically, in the technique disclosed in Non-Patent Literature 1, the spectroscopic analysis device has two imaging elements and has a large size.

The present invention has been made in view of the above-described problems, and an object thereof is to provide a spectroscopic analysis device capable of improving wavelength resolution. Another object of the present invention is to provide a compact spectroscopic analysis device.

Solution to Problem

In order to attain the objects, an analysis device according to an aspect of the present invention includes: a light source configured to emit light including a plurality of wavelength components, a polarizer configured to convert the light emitted from the light source to a light of linearly polarized light to be radiated to a sample, a polarizing diffraction element configured to diffract and spectrally disperse a first polarization component included in the light having passed through the sample in a first direction, the polarizing diffraction element being configured to diffract and spectrally disperse a second polarization component included in the light in a second direction different from the first direction, a prism which is disposed on an exit side of the polarizing diffraction element and which has a first exit surface crossing the first direction and a second exit surface crossing the second direction, and in which angles of the first exit surface and the second exit surface with respect to a reference plane including the first direction and the second direction are different, an imaging element configured to capture an image of the first polarization component emitted from the first exit surface of the prism and an image of the second polarization component emitted from the second exit surface, and a processor configured to analyze the sample based on an imaging result of the imaging element.

In the analysis device according to an aspect of the present invention, an angle between the first direction and the first exit surface in the reference plane may be set to such an angle that a dispersion angle of the spectrally dispersed first polarization component is expanded, and an angle between the second direction and the second exit surface in the reference plane may be set to such an angle that a dispersion angle of the spectrally dispersed second polarization component is expanded.

The analysis device according to an aspect of the present invention may further include a cylindrical lens disposed between the polarizer and the sample to shape the light radiated to the sample into light extending in a direction crossing the reference plane.

In the analysis device according to an aspect of the present invention, the angle of the first exit surface with respect to the reference plane may be 90°, and the angle of the second exit surface with respect to the reference plane may be 45°.

In the analysis device according to an aspect of the present invention, the prism may be a planar member of which a shape in the reference plane is trapezoidal, the first exit surface of the prism may be a surface including a first leg of the trapezoid, and the second exit surface of the prism may be a surface including a second leg of the trapezoid.

Advantageous Effects of Invention

According to the present invention, it is possible to improve wavelength resolution.

DESCRIPTION OF EMBODIMENTS

Figure 1:
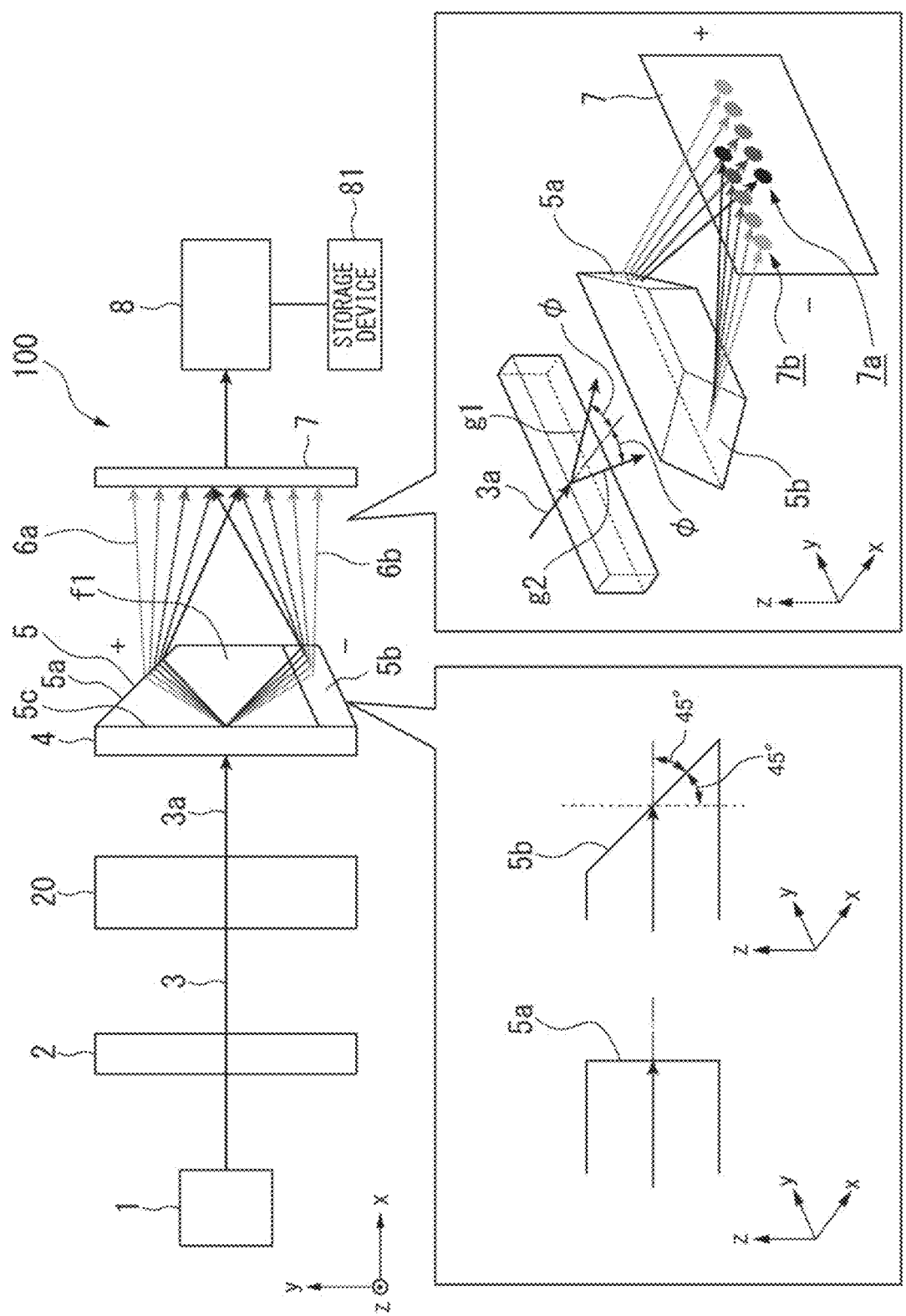
FIG. 1 is a diagram illustrating a configuration example of a spectroscopic analysis device according to a first embodiment.

Hereinafter, an embodiment of the present invention will be described with reference to the drawings. In the drawings used in the following description, the scales of respective members are changed appropriately so that the respective members have recognizable sizes.

First Embodiment

FIG. 1 is a diagram illustrating a configuration example of a spectroscopic analysis device 100 according to the present embodiment. As illustrated in FIG. 1, the spectroscopic analysis device 100 includes a light source 1, a polarizer 2, a polarizing diffraction element 4, a prism 5, an imaging element 7, a processor 8, and a storage device 81.

In the present embodiment, light is radiated to a sample 20 to analyze the amounts of components in the sample 20.

In FIG. 1, an optical axis is an x-axis direction, a direction vertical to the x-axis direction is a y-axis direction, and a depth direction of an xy plane is a z-axis direction.

The light source 1, the polarizer 2, the polarizing diffraction element 4, the prism 5, and the imaging element 7 are arranged in the order of the light source 1, the polarizer 2, the polarizing diffraction element 4, the prism 5, and the imaging element 7 in the x-axis direction which is an optical axis direction of the light source 1. The prism 5 is disposed adjacent to or close to the polarizing diffraction element 4.

The sample 20 is disposed between the polarizer 2 and the polarizing diffraction element 4 in the x-axis direction which is the optical axis direction of the light source 1.

The light source 1 is a light source emitting light having a wavelength corresponding to a sample to be analyzed and is a wide-band light source or a light source that emits infrared light.

The polarizer 2 is a transmission polarizer that converts a light beam incident from the light source 1 to a linearly polarized light beam 3. The linearly polarized light beam 3 converted by the polarizer 2 is radiated to the sample 20.

A light beam having passed through the sample 20 is incident on the polarizing diffraction element 4. The polarizing diffraction element 4 is a transmission polarizing diffraction element having form birefringence or molecular orientation (liquid-crystalline) birefringence. The polarizing diffraction element 4 diffracts and spectrally disperses a clockwise circularly polarized light component in the xy plane in a first direction g1 having an upper-side (positive side) angle φ with respect to the optical axis. The polarizing diffraction element 4 diffracts and spectrally disperses a counter-clockwise circularly polarized light component on the xy plane in a second direction g2 having a lower-side (negative side) angle φ with respect to the optical axis. In the present embodiment, a plane including the first direction g1 and the second direction g2 is a reference plane f1. Spectrally dispersing means dispersing incident light according to a wavelength by refracting the incident light with different refractive indices depending on a wavelength.

The prism 5 is a planar optical member which has a trapezoidal shape in the xy plane and has a thickness in the z-axis direction, for example. The prism 5 has a first exit surface 5a which is a surface including a first leg of the trapezoidal shape, a second exit surface 5b which is a surface including a second leg of the trapezoidal shape, and an incident surface 5c which is a surface including the base of the trapezoidal shape. A clockwise circularly polarized light component spectrally dispersed in the first direction and a counter-clockwise circularly polarized light component spectrally dispersed in the second direction are incident from the polarizing diffraction element 4 on the incident surface 5c of the prism 5.

The prism 5 spectrally disperses the incident spectrally dispersed clockwise circularly polarized light component by expanding a spectral dispersion angle thereof and emits the spectrally dispersed clockwise circularly polarized light component 6a from the first exit surface 5a crossing the first direction. The prism 5 spectrally disperses the incident clockwise circularly polarized light component by expanding a spectral dispersion angle thereof and emits the spectrally dispersed counter-clockwise circularly polarized light component 6b from the second exit surface 5b crossing the second direction. In this way, in the present embodiment, the wavelength resolution of the polarizing diffraction element 4 is expanded using the prism 5. A configuration of the prism 5 will be described later.

The imaging element 7 is an imaging element such as a two-dimensional charge coupled device (CCD) or a two-dimensional complementary MOS (CMOS), for example. In the imaging element 7, the spectrally dispersed clockwise circularly polarized light component 6a emitted from the first exit surface 5a is imaged at a first position 7a in the z-axis direction.

In the imaging element 7, the spectrally dispersed counter-clockwise circularly polarized light component 6b emitted from the second exit surface 5b is imaged at a second position 7b in the z-axis direction. The imaging element 7 captures the images at the first and second positions 7a and 7b. The imaging element 7 outputs the optical signals of the captured and spectrally dispersed clockwise and counter-clockwise circularly polarized light components to the processor 8.

The processor 8 derives the magnitude of circular polarization dichroism by calculating a difference between absorptivities of the sample 20 with respect to the clockwise circularly polarized light component and the counter-clockwise circularly polarized light component in respective wavelengths on the basis of the spectra of the optical signals of the spectrally dispersed clockwise and counter-clockwise circularly polarized light components output by the imaging element 7. The processor 8 analyzes the components of the sample 20 by plotting the magnitudes of the circular polarization dichroism in respective wavelengths to calculate a circular dichroism spectrum (CD spectrum). The processor 8 derives the magnitude of the circular polarization dichroism by taking the ratio of the intensity of the clockwise circularly polarized light component and the intensity of the counter-clockwise circularly polarized light component in respective wavelengths, calculating the log of the ratio, and dividing the log of the ratio by 2 using Expression (8) in Non-Patent Literature 1, for example.

The storage device 81 stores a relationship between the position of an image formed on the imaging element 7, a wavelength, and a polarization component in advance.

Next, the prism 5 will be described in further detail.

Figure 2:
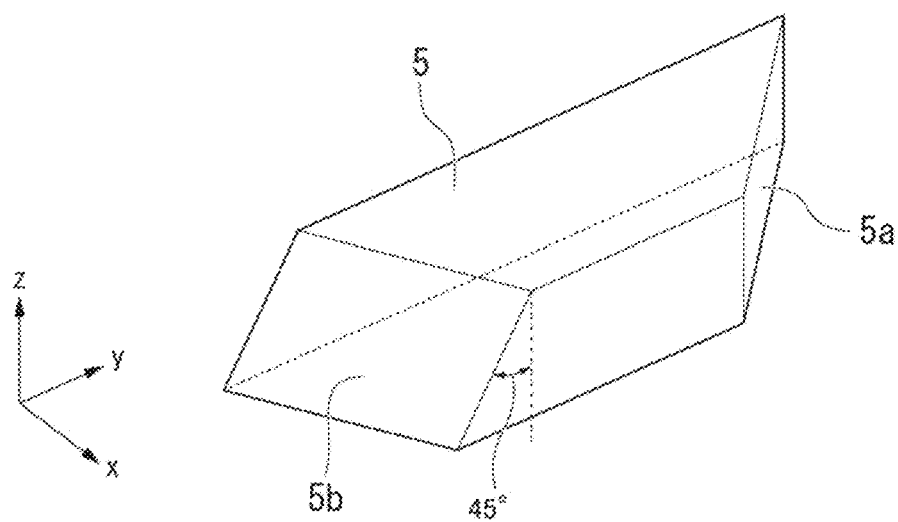
FIG. 2 is a perspective view of a prism according to the first embodiment.
Figure 3:
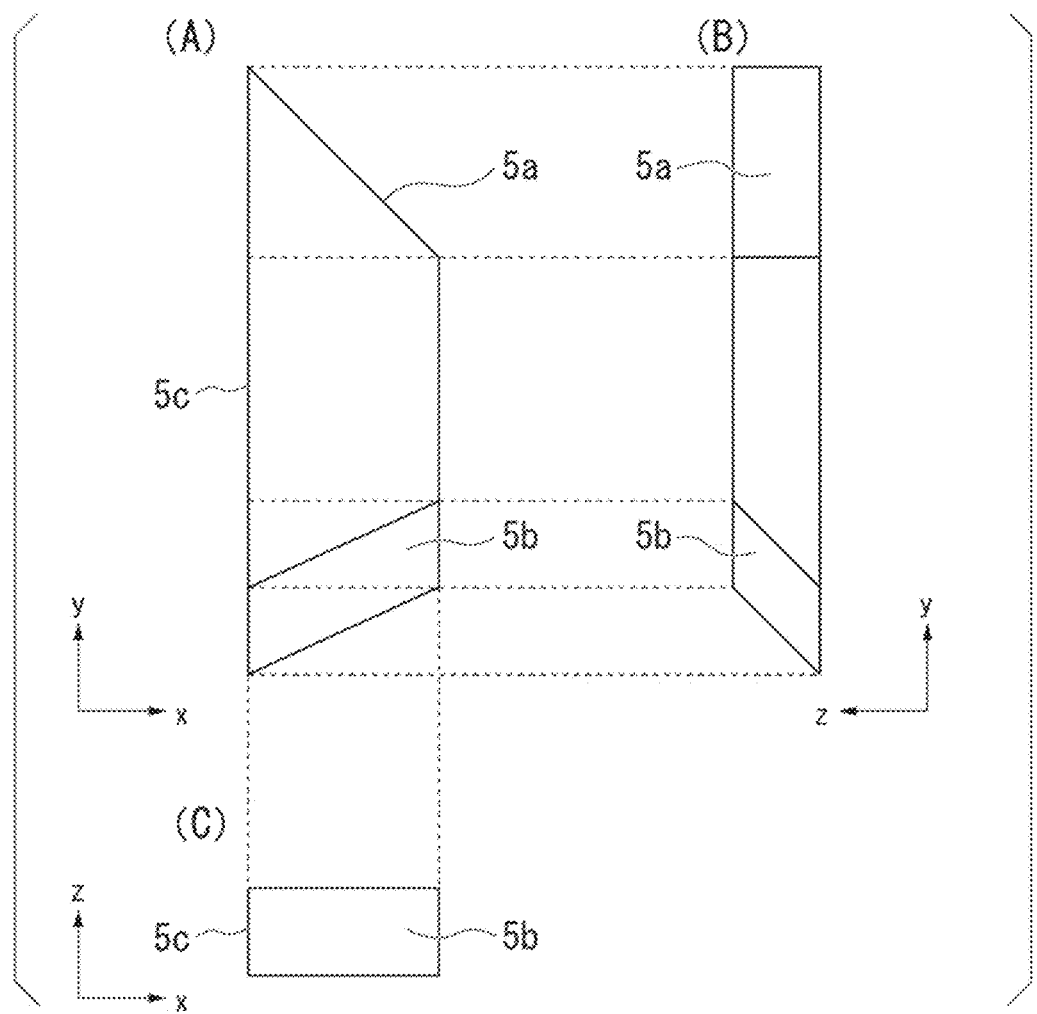
FIG. 3 is a trihedral figure of the prism according to the first embodiment.

FIG. 2 is a perspective view of the prism 5 according to the present embodiment. FIG. 3 is a trihedral figure of the prism 5 according to the present embodiment. FIG. 3(A) is a front view. FIG. 3(B) is a right side view. FIG. 3(C) is a bottom view.

As illustrated in FIGS. 2 and 3, the first exit surface 5a of the prism 5 has a first exit surface 5a that is at 90° with respect to the reference plane f1. The second exit surface 5b of the prism 5 has a second exit surface 5b that is at 45° with respect to the reference plane f1.

Figure 4:
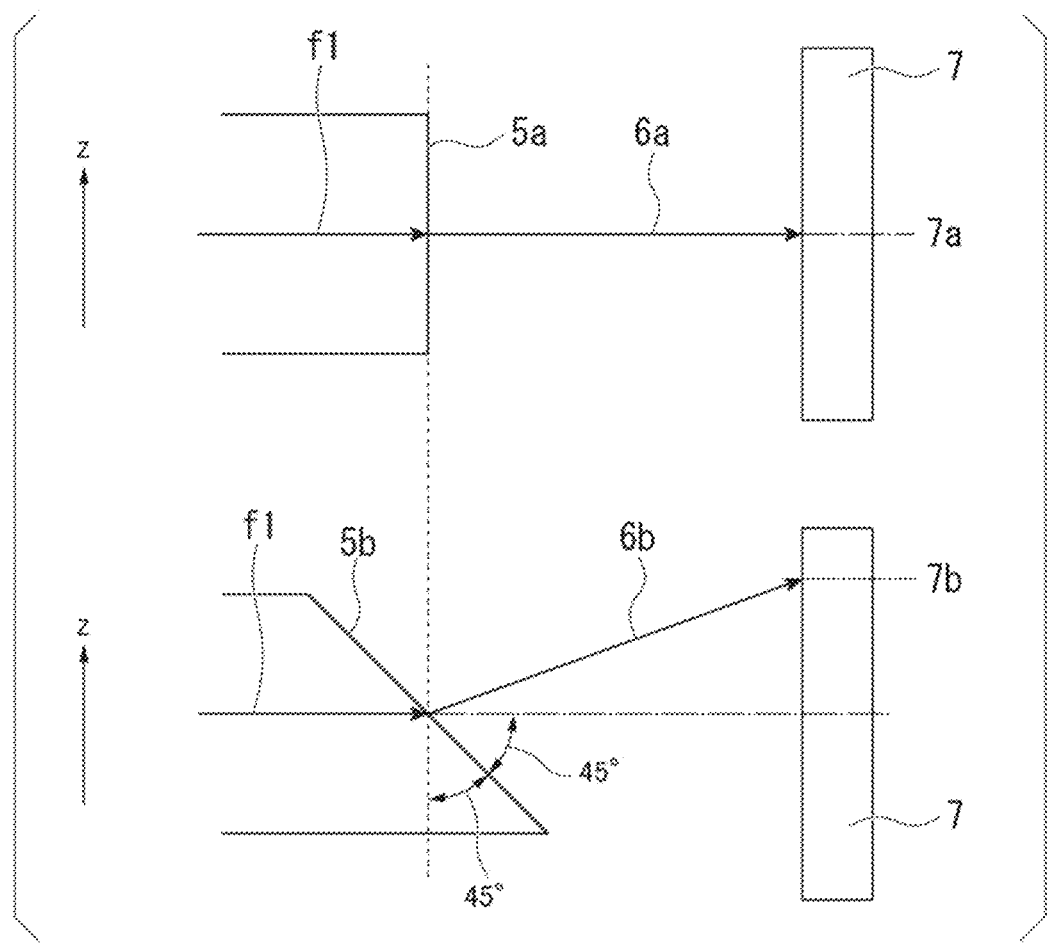
FIG. 4 is a diagram illustrating an imaging position on an imaging element by the prism according to the first embodiment.

As described above, in the present embodiment, since the angle between the first exit surface 5a of the prism 5 and the xy plane and the angle between the second exit surface 5b and the xy plane are different, the position in the z-axis direction of an image formed on the imaging element 7 can be separated as illustrated in FIG. 4. FIG. 4 is a diagram illustrating an imaging position on the imaging element 7 by the prism 5 according to the present embodiment.

As illustrated in FIG. 4, the spectrally dispersed clockwise circularly polarized light component 6a emitted from the first exit surface 5a is imaged at the first position 7a. The first position 7a is the optical axis position in the z-axis direction and, for example, is the central position in the z-axis direction of the imaging element 7.

As illustrated in FIG. 4, the spectrally dispersed counter-clockwise circularly polarized light component 6b emitted from the second exit surface 5b is imaged at the second position 7b. The second position 7b is a position on the upper side from the optical axis position in the z-axis direction.

Figure 5:
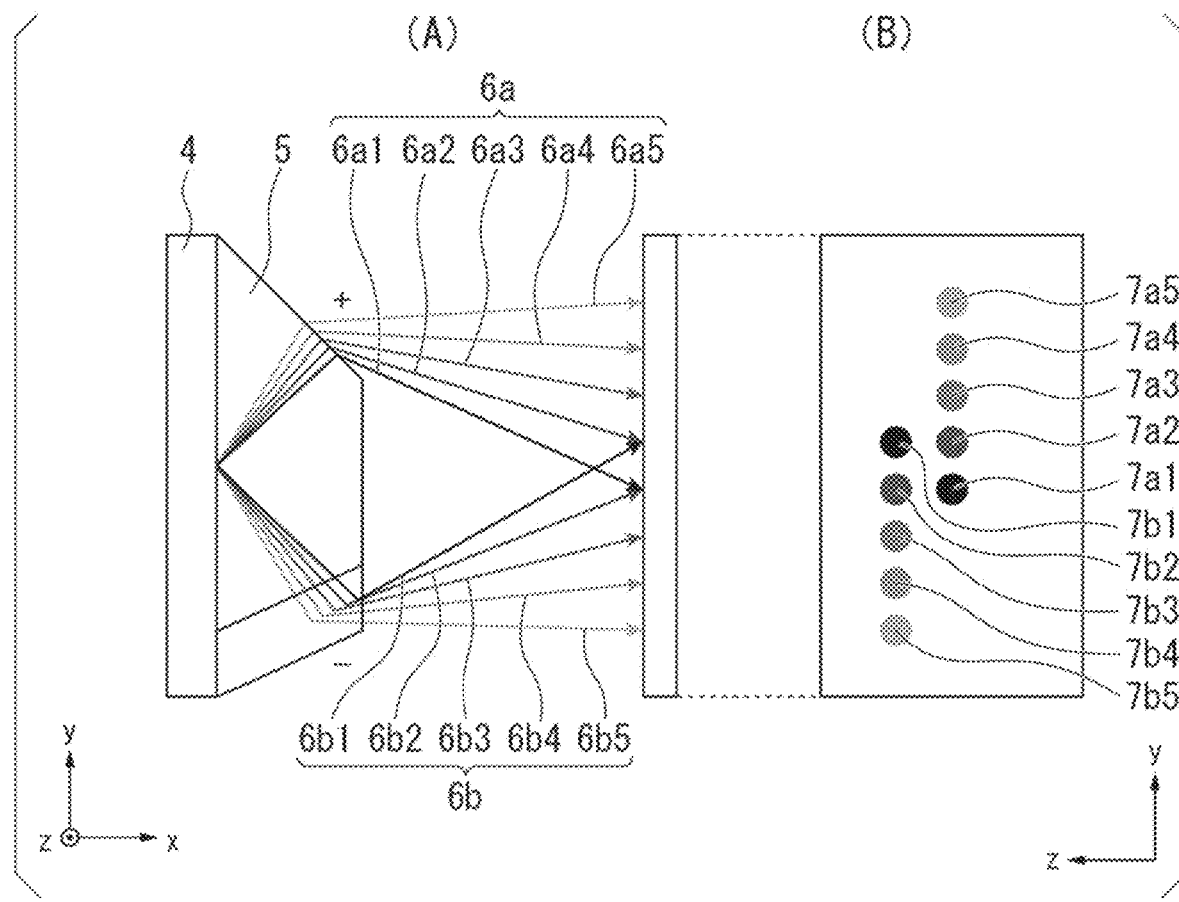
FIG. 5 is a diagram illustrating imaging positions on an imaging element of a clockwise circularly polarized light component and a counter-clockwise circularly polarized light component spectrally dispersed by the prism according to the present embodiment.

FIG. 5 is a diagram illustrating the imaging positions on the imaging element 7 of the clockwise circularly polarized light component 6a and the counter-clockwise circularly polarized light component 6b spectrally dispersed by the prism 5 according to the present embodiment. FIG. 5(A) is a plan view of the polarizing diffraction element 4, the prism 5, and the imaging element 7 on the xy plane. FIG. 5(B) is a plan view of the imaging element 7 on the xy plane.

The clockwise circularly polarized light component is diffracted by the polarizing diffraction element 4 toward the upper side (positive side) in the y-axis direction. The counter-clockwise circularly polarized light component is diffracted by the polarizing diffraction element 4 toward the lower side (negative side) in the y-axis direction. A diffraction angle of the clockwise circularly polarized light component incident from the incident surface 5c of the prism 5 is expanded to the positive side by the angle on the xy plane of the first exit surface 5a of the prism 5. Similarly, a diffraction angle of the counter-clockwise circularly polarized light component incident from the incident surface 5c of the prism 5 is expanded to the negative side by the angle on the xy plane of the second exit surface 5b of the trapezoid of the prism 5. In this manner, in the prism 5, it is possible to enhance the spectral dispersion ability by expanding the inclination angle of diffracted light. As a result, according to the present embodiment, as illustrated in FIG. 5(B), it is possible to shorten the distance between the polarizing diffraction element 4 and the imaging element 7.

As a result, a light beam obtained by spectrally dispersing the clockwise circularly polarized light component by the prism 5 is spectrally dispersed like light beams 6a1 to 6a5 in such a way that the spectral dispersion angle thereof is expanded as illustrated in FIG. 5. The light beam 6a1 is imaged at a position 7a1 of the imaging element 7. The light beam 6a2 is imaged at a position 7a2 of the imaging element 7. The light beam 6a3 is imaged at a position 7a3 of the imaging element 7. The light beam 6a4 is imaged at a position 7a4 of the imaging element 7. The light beam 6a5 is imaged at a position 7a5 of the imaging element 7.

Moreover, a light beam obtained by spectrally dispersing the counter-clockwise circularly polarized light component by the prism 5 is spectrally dispersed like light beams 6b1 to 6b5 in such a way that the spectral dispersion angle thereof is expanded as illustrated in FIG. 5. A light beam 6bn (n is an integer of any one of 1 to 5) is imaged at a position 7bn of the imaging element 7.

In FIG. 5, among light beams 6α1 to 6α5 (α is a or b), a first wavelength of the light beam 6α1 is the shortest, and a fifth wavelength of the light beam 6α5 is the longest. A second wavelength of the light beam 6α2 is longer than a first wavelength of the light beam 6α1. A third wavelength of the light beam 6α3 is longer than a second wavelength of the light beam 6α2. A fourth wavelength of the light beam 6α4 is longer than a third wavelength of the light beam 6α3. A fifth wavelength of the light beam 6α5 is the longest.

Although FIG. 5 illustrates an example in which light is dispersed into five wavelengths by the polarizing diffraction element 4, there is no limitation thereto. The number of wavelengths dispersed by the polarizing diffraction element 4 need only be two or more, and may be three or five or more. In the example illustrated in FIG. 5 and the like, the images formed on the imaging element 7 are depicted by dots in order to simplify description. Actually, the images formed on the imaging element 7 are images in which the images at the positions 7a1 to 7a5 are continuous and the images at the positions 7b1 to 7b5 are continuous.

The storage device 81 stores a relationship between an image formed on the imaging element 7, a wavelength thereof, and a polarization component in advance.

A light beam incident on the prism 5 and a light beam emitted by the prism 5 will be described in further detail.

Figure 6:
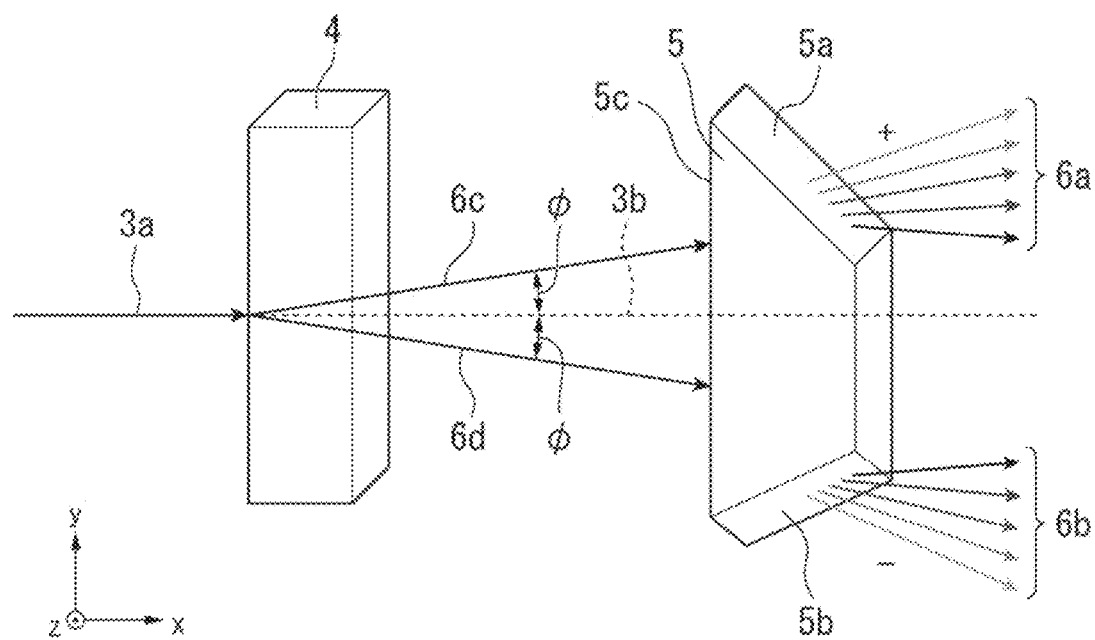
FIG. 6 is a diagram illustrating an example of a light beam incident on the prism according to the first embodiment and a light beam emitted by the prism.

FIG. 6 is a diagram illustrating an example of a light beam incident on the prism 5 according to the present embodiment and a light beam emitted by the prism 5. A coordinate system is the same as that of FIG. 1. In FIG. 6, the polarizing diffraction element 4 and the prism 5 are depicted separately from each other for description of light beams.

A light beam 3a having passed through the sample 20 (FIG. 1) is incident on the polarizing diffraction element 4. The polarizing diffraction element 4 diffracts and separates the light beam 3a into a clockwise circularly polarized light component 6c (a first polarization component) and a counter-clockwise circularly polarized light component 6d (a second polarization component). The clockwise circularly polarized light component 6c has a counter-clockwise angle φ with respect to the optical axis 3b. The counter-clockwise circularly polarized light component 6d has a clockwise angle φ with respect to the optical axis 3b. The light beam of the clockwise circularly polarized light component 6c and the light beam of the counter-clockwise circularly polarized light component 6d are formed on the reference plane f1. FIG. 6 illustrates representative light beams among spec-trally dispersed light beams. The polarizing diffraction element 4 is configured as disclosed in Patent Literature 1, for example.

The clockwise circularly polarized light component 6c and the counter-clockwise circularly polarized light component 6d separated and spectrally dispersed by the polarizing diffraction element 4 are incident on the incident surface 5c of the prism 5. A light beam of the spectrally dispersed clockwise circularly polarized light component 6a is emitted from the first exit surface 5a of the prism 5. A light beam of the spectrally dispersed clockwise circularly polarized light component 6b is emitted from the second exit surface 5b of the prism 5.

In this case, since the first exit surface 5a is disposed vertically to the reference plane f1, the light beam of the clockwise circularly polarized light component 6a is formed on the reference plane f1. On the other hand, since the second exit surface 5b is disposed at an angle of 45° with respect to the reference plane f1, the light beam of the counter-clockwise circularly polarized light component 6b is formed on a plane having an angle of 45° (a second prescribed angle) with respect to the reference plane f1.

A relationship between the reference plane f1, a plane based on the clockwise circularly polarized light component 6a obtained by spectrally dispersing a clockwise circularly polarized light component, and a plane based on the counter-clockwise circularly polarized light component 6b obtained by spectrally dispersing a counter-clockwise circularly polarized light component will be described in further detail.

Figure 7:
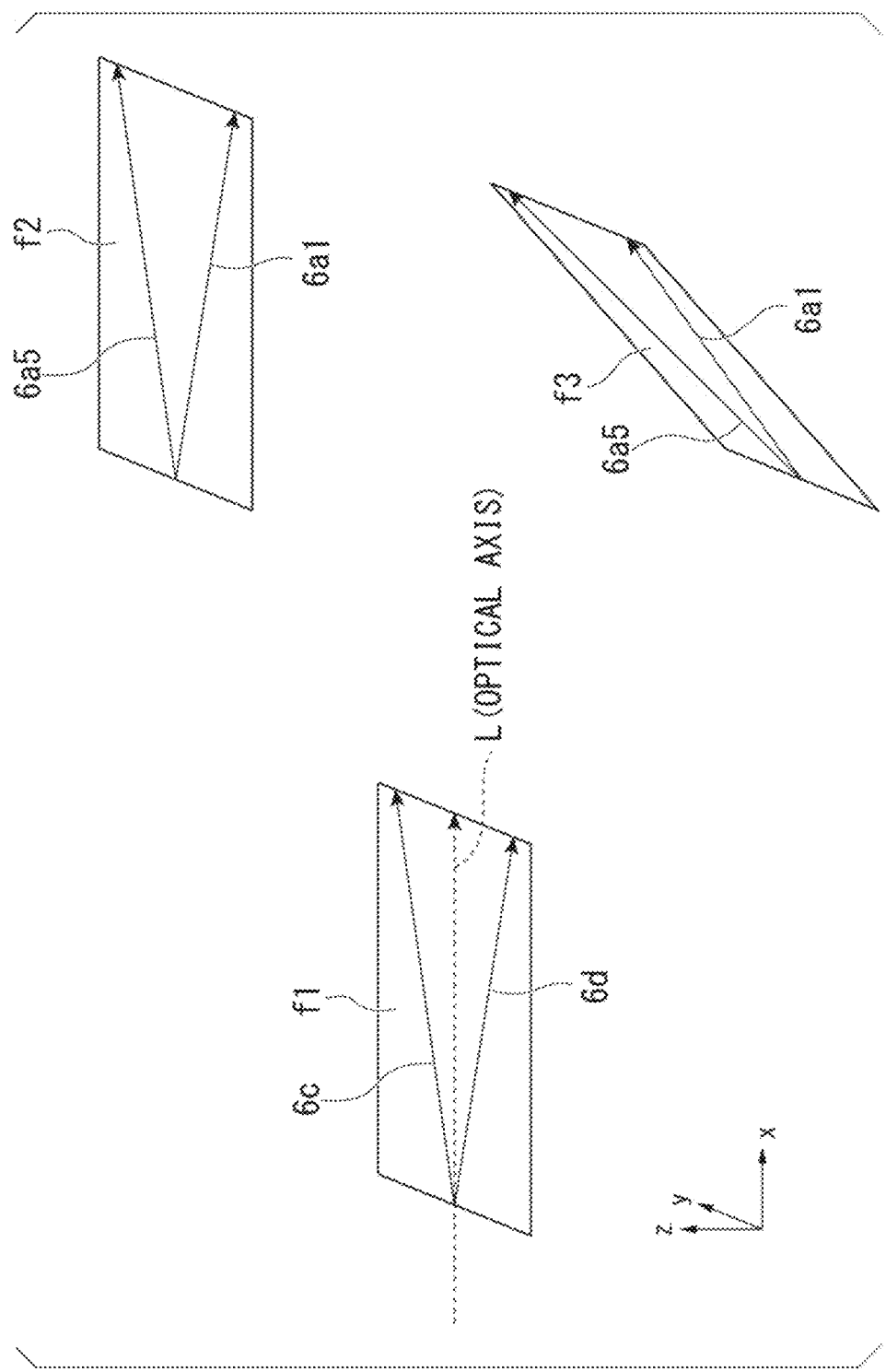
FIG. 7 is a diagram illustrating an example of a relationship between a reference plane, a plane based on a light beam obtained by spectrally dispersing the clockwise circularly polarized light component, and a plane based on a light beam obtained by spectrally dispersing the counter-clockwise circularly polarized light component according to the first embodiment.
Figure 8:
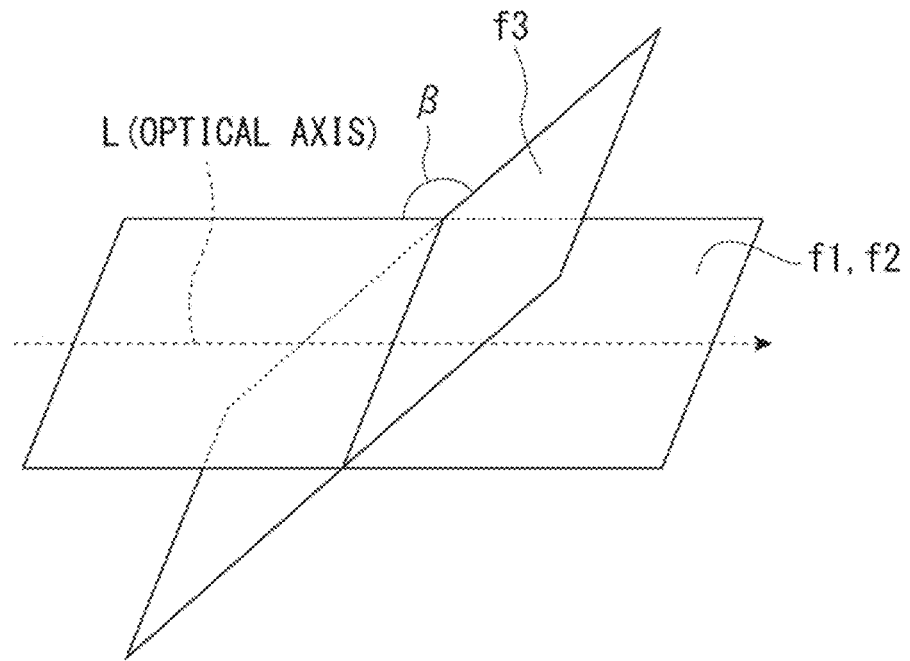
FIG. 8 is a diagram illustrating an angle between a reference plane, a plane based on a light beam obtained by spectrally dispersing the clockwise circularly polarized light component, and a plane based on a light beam obtained by spectrally dispersing the counter-clockwise circularly polarized light component according to the first embodiment.

FIG. 7 is a diagram illustrating an example of a relationship between the reference plane f1 according to the present embodiment, a plane f2 based on a light beam obtained by spectrally dispersing the clockwise circularly polarized light component 6a, and a plane f3 based on a light beam obtained by spectrally dispersing the counter-clockwise circularly polarized light component 6b. FIG. 8 is a diagram illustrating an angle between the reference plane f1 according to the present embodiment, a plane f2 based on a light beam obtained by spectrally dispersing the clockwise circularly polarized light component 6a, and a plane f3 based on a light beam obtained by spectrally dispersing the counter-clockwise circularly polarized light component 6b.

In FIGS. 7 and 8, as described above, the reference plane f1 is a plane including the first and second directions g1 and g2. The plane f2 is a plane including a light beam obtained by spectrally dispersing the clockwise circularly polarized light component 6a. The plane f3 is a plane including a light beam obtained by spectrally dispersing the counter-clockwise circularly polarized light component 6b.

The reference plane f1 and the plane f2 based on the light beam obtained by spectrally dispersing the clockwise circularly polarized light component 6a are formed on the same xy plane. Therefore, when the plane f2 based on the light beam obtained by spectrally dispersing the clockwise circularly polarized light component 6a is moved within the xy plane, the reference plane f1 overlaps the plane f2 based on the light beam obtained by spectrally dispersing the clockwise circularly polarized light component 6a.

On the other hand, when the plane f3 based on the light beam obtained by spectrally dispersing the counter-clockwise circularly polarized light component 6b is moved within the xy plane, the reference plane f1 and the plane f3 based on the light beam obtained by spectrally dispersing the counter-clockwise circularly polarized light component 6b have an angle β. That is, in the present embodiment, the plane f3 based on the light beam obtained by spectrally dispersing the counter-clockwise circularly polarized light component 6b has an angle β which is the second prescribed angle with respect to the plane f2 based on the light beam obtained by spectrally dispersing the clockwise circularly polarized light component 6a.

Although the above-described example is an example in which the second exit surface 5b of the prism 5 is inclined at 45° with respect to the reference plane f1, there is no limitation thereto. As illustrated in FIG. 5, the inclination angle may be such an angle that the images formed on the imaging element 7 are separated. For example, the second exit surface 5b in the z-axis direction may be inclined at −45° with respect to the reference plane f1. In this case, in FIG. 4, the spectrally dispersed counter-clockwise circularly polarized light component 6b emitted from the second exit surface 5b is imaged at a lower-side position from the optical axis position in the z-axis direction.

Moreover, the second exit surface 5b may be vertical to the reference plane f1, and the first exit surface 5a may be inclined at 45°, for example, with respect to the reference plane f1.

Furthermore, the first exit surface 5a may be inclined at a first prescribed angle with respect to the reference plane f1, and the second exit surface 5b may be inclined at an angle of (first prescribed angle±second prescribed angle) with respect to the reference plane f1.

Figure 9:
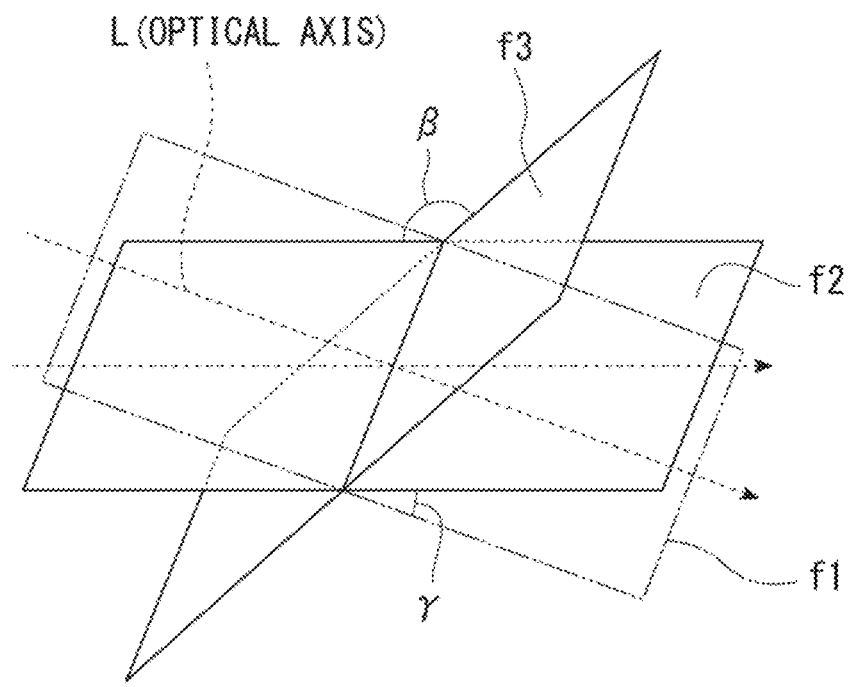
FIG. 9 is a diagram illustrating an example of a relationship between the planes when a first exit surface according to the first embodiment is not vertical to the reference plane.

As described above, when the first exit surface 5a is not vertical to the reference plane f1, as illustrated in FIG. 9, the plane f3 based on the light beam of the clockwise circularly polarized light component 6a emitted from the first exit surface 5a may have a first prescribed angle (γ) with respect to the reference plane f1.

FIG. 9 is a diagram illustrating an example of a relationship between respective planes when the first exit surface 5a according to the present embodiment is not vertical to the reference plane f1.

The first exit surface 5a may be inclined at 45°, for example, with respect to the reference plane f1, and the second exit surface 5b may be inclined at −45°, for example, with respect to the reference plane f1. With this configuration, it is possible to further suppress crosstalk between the clockwise circularly polarized light component 6a and the counter-clockwise circularly polarized light component 6b as compared to the configuration illustrated in FIG. 1.

Due to the above-described configuration, in the present embodiment, the reference plane f1 formed by the clockwise circularly polarized light component 6c (the first polarization component) and the counter-clockwise circularly polarized light component 6d (the second polarization component) incident on the prism 5 and a plane formed by a light beam of the clockwise circularly polarized light component 6a emitted from the first exit surface 5a are formed on the same plane. In the present embodiment, the plane formed by the light beam of the clockwise circularly polarized light component 6a emitted from the first exit surface 5a and the reference plane f1 are the same plane, and the plane formed by the light beam of the counter-clockwise circularly polarized light component 6b emitted from the second exit surface 5b and the reference plane f1 have the second prescribed angle (45°). Due to this, according to the present embodiment, as illustrated in FIGS. 4 and 5, it is possible to image the clockwise circularly polarized light component 6a and the counter-clockwise circularly polarized light component 6b at different positions in the z-axis direction on the imaging element 7.

As described above, according to the present embodiment, since the clockwise circularly polarized light component and the counter-clockwise circularly polarized light component can be adjusted angularly by the prism 5 to be on the same axis, it is possible to obtain a circular dichroism spectrum using one two-dimensional imaging element. As a result, according to the present embodiment, it is possible to realize simultaneousness of two circularly polarized light components.

According to the present embodiment, since spectral dispersion ability can be enhanced while suppressing crosstalk between the clockwise circularly polarized light component 6a and the counter-clockwise circularly polarized light component 6b using the polarizing diffraction element 4 and the prism 5 in combination, it is possible to shorten the distance to the imaging element 7. As a result, according to the present embodiment, it is possible to improve wavelength resolution and to reduce the size of the spectroscopic analysis device 100 as compared to the conventional device. In this way, according to the present embodiment, the size of the spectroscopic analysis device 100 is reduced by integrating the imaging elements 7.

According to the present embodiment, since an image can be captured by one imaging element 7, adjustment of an optical system is not necessary like a case in which two imaging elements are used.

The incident surface 5c of the prism 5 is disposed adjacent to or close (adhered) to the exit surface of the polarizing diffraction element 4. The polarizing diffraction element 4 and the incident surface 5c of the prism 5 may be bonded by adhesive or abrasive bonding. Alternatively, a space may be formed between the polarizing diffraction element 4 and the incident surface 5c of the prism 5 so that they are mechanically fixed. When the polarizing diffraction element 4 and the incident surface 5c of the prism 5 are bonded by adhesive or abrasive bonding, it is possible to obtain an advantage that optical adjustment of the polarizing diffraction element 4 and the prism 5 is not required. In this case, optical adjustment is required only in the z-axis direction of the imaging element 7.

When an optical element is divided into three parts as in the conventional technique, adjustment is required in a tilt direction as well as in the z-axis direction of the imaging element 7. As described above, according to the present embodiment, since adjustment can be reduced as compared to the conventional technique, it is possible to reduce accuracy errors resulting from the adjustment.

Second Embodiment

Figure 10:
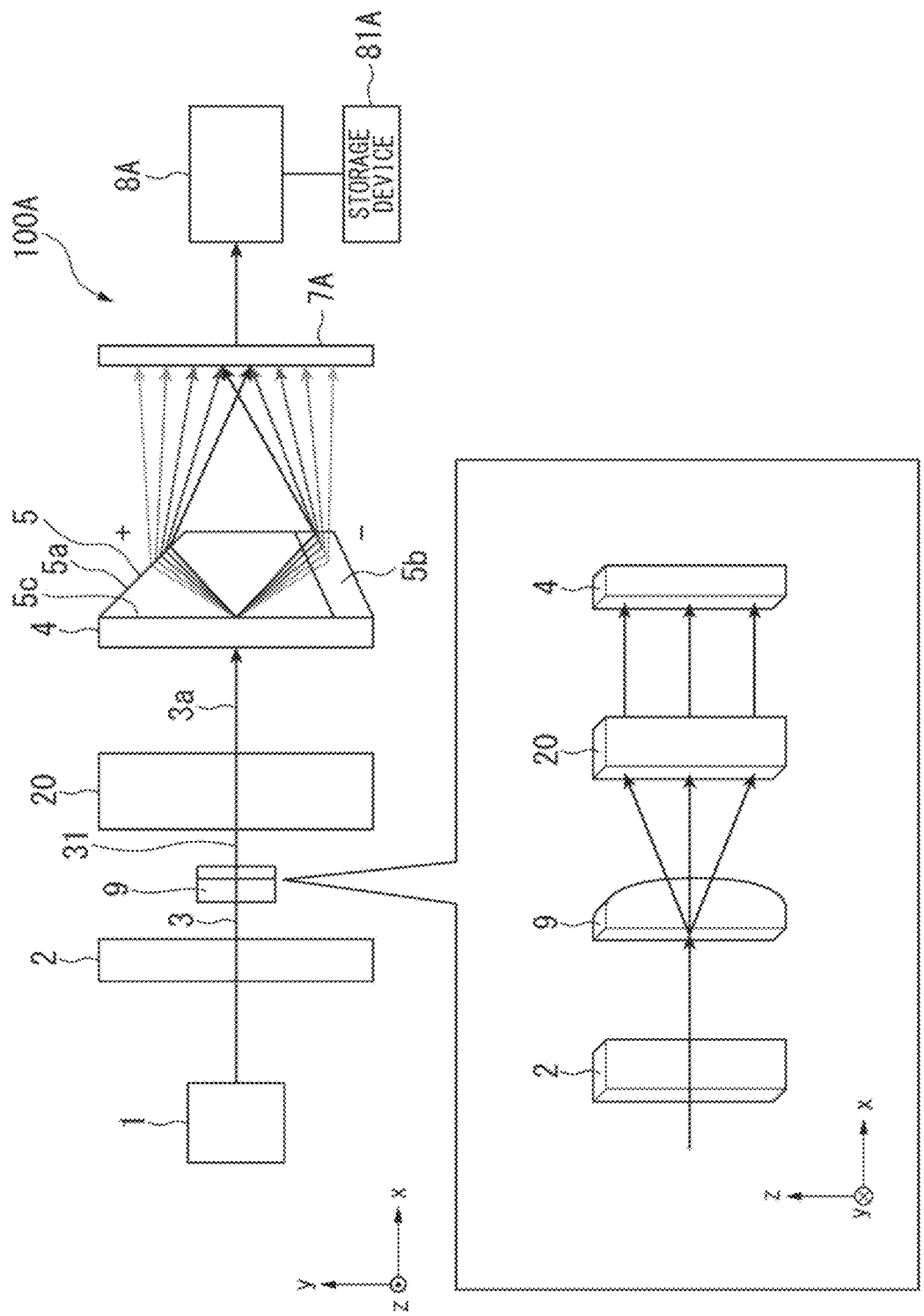
FIG. 10 is a diagram illustrating a configuration example of a spectroscopic analysis device according to a second embodiment.

FIG. 10 is a diagram illustrating a configuration example of a spectroscopic analysis device 100A according to the present embodiment. As illustrated in FIG. 10, the spectroscopic analysis device 100A includes a light source 1, a polarizer 2, a polarizing diffraction element 4, a prism 5, an imaging element 7A, a processor 8A, a storage device 81A, and a cylindrical lens 9.

In the present embodiment, light is radiated to a sample 20 to analyze the amounts of components in the sample 20.

In FIG. 6, an optical axis is an x-axis direction, a direction vertical to the x-axis direction is a y-axis direction, and a depth direction of an xy plane is a z-axis direction. Moreover, components having the same functions as those of the spectroscopic analysis device 100 will be denoted by the same reference numerals, and description thereof will be omitted.

The light source 1, the polarizer 2, the polarizing diffraction element 4, the prism 5, the cylindrical lens 9, and the imaging element 7A are disposed in the order of the light source 1, the polarizer 2, the polarizing diffraction element 4, the prism 5, the cylindrical lens 9, and the imaging element 7A in the x-axis direction which is an optical axis direction of the light source 1. The prism 5 is disposed adjacent to or close to the polarizing diffraction element 4.

The sample 20 is disposed between the cylindrical lens 9 and the polarizing diffraction element 4 in the x-axis direction which is the optical axis direction of the light source 1.

The polarizer 2 is a transmission polarizer that converts a light beam incident from the light source 1 to light beam 3 of the linearly polarized light. The light beam 3 of the linearly polarized light converted by the polarizer 2 is emitted to the cylindrical lens 9.

The light beam 3 of the linearly polarized light emitted by the polarizer 2 is incident on the cylindrical lens 9. The cylindrical lens 9 converts the incident light beam of the linearly polarized light to a line beam 31 and radiates the converted line beam 31 to the sample 20. That is, the cylindrical lens 9 shapes the light radiated to the sample 20 into light extending in a direction crossing the reference plane f1. In this way, according to the present embodiment, optical characteristics in the z-axis direction of the sample 20 can all be measured at once.

A light beam having passed through the sample 20 is incident on the polarizing diffraction element 4. In this case, since the light beam having passed through the sample 20 is a line beam, the transmission light includes position information in the z-axis direction. The polarizing diffraction element 4 is a transmission polarizing diffraction element having form birefringence or molecular orientation (liquid-crystalline) birefringence. The polarizing diffraction element 4 diffracts and spectrally disperses the line beam of a clockwise circularly polarized light component toward an upper side (positive side) with respect to the optical axis. The polarizing diffraction element 4 diffracts and spectrally disperses the line beam of a counter-clockwise circularly polarized light component toward a lower side (negative side) with respect to the optical axis.

The prism 5 is a quadrangular prism of which the shape in the xy plane is trapezoidal, and a line beam of a spectrally dispersed clockwise circularly polarized light component having a prescribed angle with respect to the optical axis and a line beam of a spectrally dispersed counter-clockwise circularly polarized light component having a prescribed angle with respect to the optical axis are incident from the polarizing diffraction element 4 to the bottom of the prism 5. The prism 5 expands a spectral dispersion angle of the incident line beam of the spectrally dispersed clockwise circularly polarized light component and emits the line beam of the spectrally dispersed clockwise circularly polarized light component 6a from the first exit surface 5a. The prism 5 expands a spectral dispersion angle of the incident clockwise circularly polarized light component and emits the line beam of the spectrally dispersed counter-clockwise circularly polarized light component 6b from the second exit surface 5b. In this way, in the present embodiment, the wavelength resolution of the polarizing diffraction element 4 is expanded using the prism 5.

The imaging element 7A is an imaging element such as a two-dimensional CCD or a two-dimensional CMOS, for example. The imaging element 7A captures the image of the clockwise circularly polarized light component 6a and the image of the counter-clockwise circularly polarized light component 6b emitted by the prism 5. The imaging element 7A outputs the captured signal of the clockwise circularly polarized light component 6a and the captured signal of the counter-clockwise circularly polarized light component 6b to the processor 8A. The processor 8A derives the magnitude of the circular polarization dichroism by taking the ratio of the intensity of the clockwise circularly polarized light component and the intensity of the counter-clockwise circularly polarized light component in respective wavelengths, calculating the log of the ratio, and dividing the log of the ratio by 2 using Expression (8) in Non-Patent Literature 1, for example. A light beam incident on the imaging element 7A and an imaging position will be described later.

The signal of the clockwise circularly polarized light component 6a output by the imaging element 7A and the signal of the imaged counter-clockwise circularly polarized light component 6b are input to the processor 8A. The processor 8A analyzes the components of the sample 20 by calculating a difference between the absorptivities of the sample 20 with respect to the clockwise circularly polarized light component and the counter-clockwise circularly polarized light component in respective wavelengths and calculating a circular dichroism spectrum. The images from which a difference is taken by the processor 8A will be described later with reference to FIG. 8.

The storage device 81A stores a relationship between the position of an image formed on the imaging element 7A, a wavelength, and a polarization component in advance.

Figure 11:
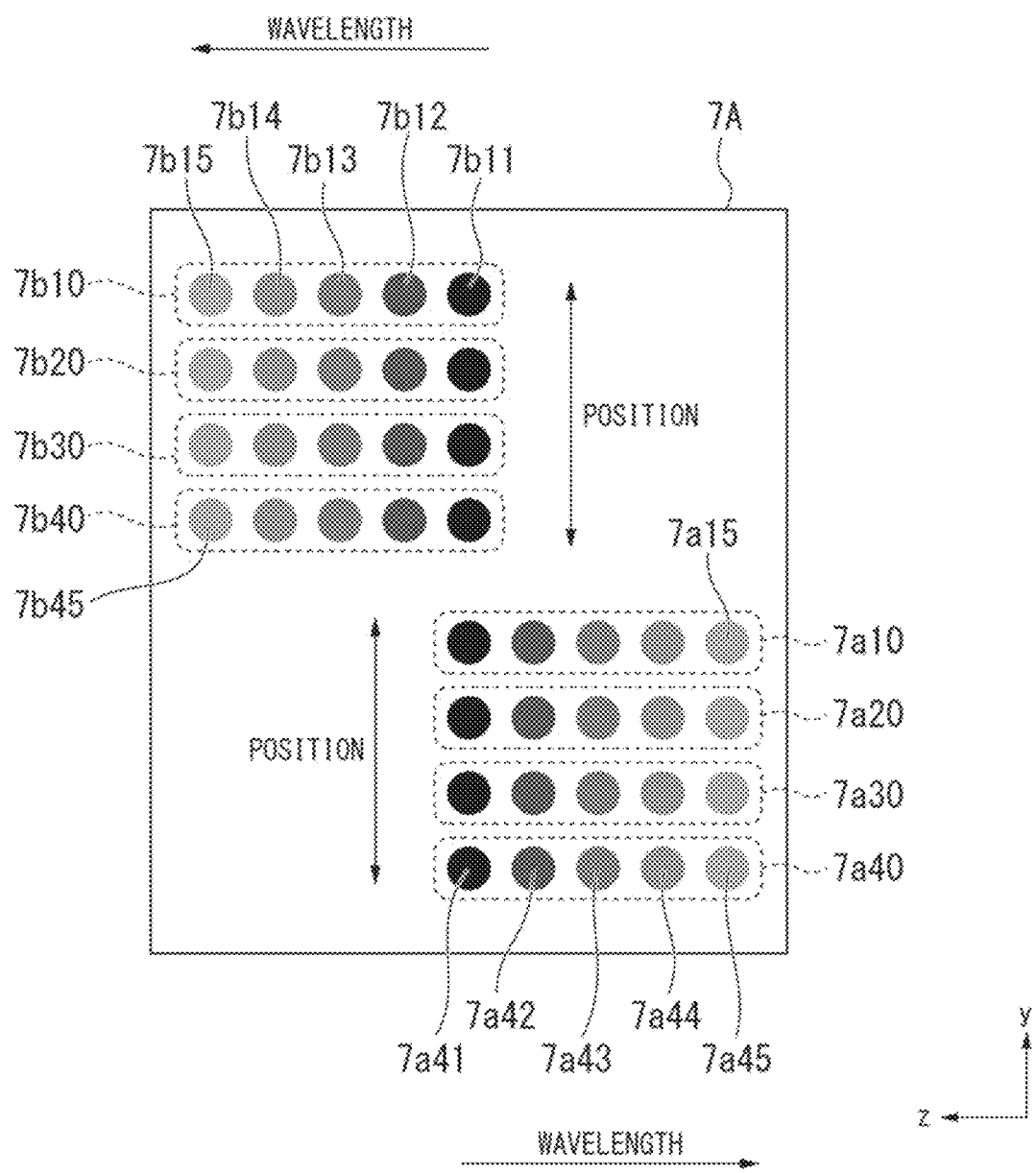
FIG. 11 is a diagram illustrating line beams of respective wavelengths of a clockwise circularly polarized light component and line beams of respective wavelengths of a counter-clockwise circularly polarized light component imaged on an imaging element according to the second embodiment.

FIG. 11 is a diagram illustrating line beams of respective wavelengths of the clockwise circularly polarized light component 6a and line beams of respective wavelengths of the counter-clockwise circularly polarized light component 6b imaged on the imaging element 7A according to the present embodiment. In FIG. 11, a longitudinal direction is the y-axis direction, and a lateral direction is the z-axis direction.

Line beams 7a10 to 7a40 of respective wavelengths of the clockwise circularly polarized light component 6a are imaged on the imaging element 7A. The y-axis direction represents the positions corresponding to a molecular structure of the sample 20. The line beams 7a10 to 7a40 each include an image 7aN1 of a first wavelength, an image 7aN2 of a second wavelength, an image 7aN3 of a third wavelength, an image 7aN4 of a fourth wavelength, and an image 7aN5 of a fifth wavelength (N is an integer of 1 to 4). The first wavelength is the shortest wavelength. The second wavelength is longer than the first wavelength. The third wavelength is longer than the second wavelength. The fourth wavelength is longer than the third wavelength. The fifth wavelength is the longest wavelength.

Line beams 7b10 to 7b40 of respective wavelengths of the counter-clockwise circularly polarized light component 6b are imaged on the imaging element 7A. The y-axis direction represents the positions corresponding to the molecular structure of the sample 20. The line beams 7b10 to 7b40 each include an image 7bN1 of a first wavelength, an image 7bN2 of a second wavelength, an image 7bN3 of a third wavelength, an image 7bN4 of a fourth wavelength, and an image 7bN5 of a fifth wavelength (N is an integer of 1 to 4).

The processor 8A analyzes the components of the sample 20 by calculating a difference between the absorptivities of the sample 20 with respect to the clockwise circularly polarized light component 6a and the counter-clockwise circularly polarized light component 6b at the same position and having the same wavelength and calculating a circular dichroism spectrum. For example, the processor 8A calculates a difference between the signal of an image 7a41 of the clockwise circularly polarized light component and the signal of an image 7b41 of the counter-clockwise circularly polarized light component with respect to the first wavelength.

In the example illustrated in FIG. 11, the images at the respective positions and having the respective wavelengths are depicted by dots in order to simplify description. Actually, the images formed on the imaging element 7A are planar images including 7a11 to 7a45 and 7b11 to 7b45.

Due to this configuration, in the present embodiment, since the positions corresponding to the molecular structure of a sample can be obtained two-dimensionally, by capturing images while moving the sample 20 or the spectroscopic analysis device 100A, it is possible to analyze the positions corresponding to the molecular structure of the sample two-dimensionally.

Although the above-described example is an example in which the second exit surface 5b of the prism 5 is inclined at 45° with respect to the reference plane f1, there is no limitation thereto. The inclination angle of the trapezoidal second exit surface 5b with respect to the reference plane f1 may be such an angle that the images formed on the imaging element 7A are separated.

As described above, in the present embodiment, the light beam spectrally dispersed by the prism 5 is further converted to a line beam by the cylindrical lens 9.

Due to this, according to the present embodiment, since the spectrally dispersed light beam is converted to a line beam by the cylindrical lens 9, by capturing images while moving the sample 20, it is possible to analyze the molecular structure of the sample 20 two-dimensionally.

Although examples in which the prism 5 has a trapezoidal shape in the xy plane and has a thickness in the z-axis direction have been described in the first and second embodiments, there is no limitation thereto. The shape of the prism 5 may be an arbitrary shape as long as the shape is a solid including at least one incident surface and a first exit surface and a second exit surface having different angles. For example, the shape of the prism 5 may be a polygonal pillar, a quadrangular pyramid, or the like such as a quadrangular pillar of which the shape of a reference plane is quadrangular. When the shape of the prism 5 is a quadrangular prism of which the shape of a reference plane is quadrangular, a surface including one side of the quadrangle may be the first exit surface 5a, a surface including another side of the quadrangle may be the second exit surface 5b, and a surface including still another side of the quadrangle may be the incident surface 5c.

Although examples in which a clockwise circularly polarized light component is emitted from the first exit surface 5a and a counter-clockwise circularly polarized light component is emitted from the second exit surface 5b have been described in the first and second embodiments, there is no limitation thereto. The first exit surface 5a may emit a counter-clockwise circularly polarized light component and the second exit surface 5b may emit a clockwise circularly polarized light component.

A program for realizing all or some of the functions of the processor 8 (or 8A) of the present invention may be recorded on a computer-readable recording medium, and the program recorded on the recording medium may be read and executed by a computer system whereby all or some of processing of the processor 8 (or 8A) may be performed. The "computer system" mentioned herein may include an OS and hardware such as peripheral devices. Moreover, the "computer system" may include a WWW system having a homepage providing environment (or a homepage display environment). "Computer-readable recording medium" refers to a portable medium such as a flexible disk, an opto-magnetic disc, a ROM, or a CD-ROM, and a storage device such as a hard disk included in a computer system. The "computer-readable recording medium" may store a program for a predetermined period like a volatile memory (RAM) inside a computer system which serves as a server or a client when a program is transmitted via a network such as the Internet or a communication circuit such as a telephone circuit.

The program may be transmitted from a computer system that stores the program in a storage device and the like to another computer system via a transmission medium or by transmission waves in the transmission medium. Here, the "transmission medium" that transmits the program is a medium having a function of transmitting information like a network (a communication network) such as the Internet or a communication circuit (a communication line) such as a telephone circuit. The program may be a program for realizing some of the above-described functions. The program may be a so-called differential file (a differential program) capable of realizing the above-described functions in combination with a program recorded in a computer system.

While a mode for carrying out the present invention has been described with reference to embodiments, the present invention is not limited to the embodiments, and various modifications and substitutions can be made without departing from the spirit of the present invention.

REFERENCE SIGNS LIST 100, 100A: Spectroscopic analysis device
1: Light source
2: Polarizer
4: Polarizing diffraction element
5: Prism
7, 7A: Imaging element
8, 8A: Processor
9: Cylindrical lens
81: Storage device
5a: First exit surface
5b: Second exit surface
5c: Incident surface
f1: Reference plane

The invention claimed is:

1. A spectroscopic analysis device comprising:
a light source configured to emit light including a plurality of wavelength components;
a polarizer configured to convert the light emitted from the light source to a light of linearly polarized light to be radiated to a sample;
a polarizing diffraction element configured to diffract and spectrally disperse a first polarization component included in the light having passed through the sample in a first direction, the polarizing diffraction element being configured to diffract and spectrally disperse a second polarization component included in the light in a second direction different from the first direction;
a prism which is disposed on an exit side of the polarizing diffraction element and which has a first exit surface crossing the first direction and a second exit surface crossing the second direction, and in which angles of the first exit surface and the second exit surface with respect to a reference plane including the first direction and the second direction are different;
an imaging element configured to capture an image of the first polarization component emitted from the first exit surface of the prism and an image of the second polarization component emitted from the second exit surface; and a processor configured to analyze the sample based on an imaging result of the imaging element.

2. The spectroscopic analysis device according to claim 1, wherein
an angle between the first direction and the first exit surface in the reference plane is set to such an angle that a dispersion angle of the spectrally dispersed first polarization component is expanded, and
an angle between the second direction and the second exit surface in the reference plane is set to such an angle that a dispersion angle of the spectrally dispersed second polarization component is expanded.

3. The spectroscopic analysis device according to claim 1, further comprising:
a cylindrical lens disposed between the polarizer and the sample to shape the light radiated to the sample into light extending in a direction crossing the reference plane.

4. The spectroscopic analysis device according to claim 1, wherein
the angle of the first exit surface with respect to the reference plane is 90°, and
the angle of the second exit surface with respect to the reference plane is 45°.

5. The spectroscopic analysis device according to claim 4, wherein
a first spectral dispersion plane including a light beam obtained by spectrally dispersing the first polarization component using the polarizing diffraction element and the reference plane overlap each other, and
an angle of a second spectral dispersion plane including a light beam obtained by spectrally dispersing the second polarization component using the polarizing diffraction element with respect to the reference plane is a prescribed first angle.

6. The spectroscopic analysis device according to claim 1, wherein
the prism is a planar member of which a shape in the reference plane is trapezoidal,
the first exit surface of the prism is a surface including a first leg of the trapezoid, and
the second exit surface of the prism is a surface including a second leg of the trapezoid.

7. The spectroscopic analysis device according to claim 6, wherein
the prism has an incident surface which is a surface including a bottom of the trapezoid, and
the diffracted and spectrally dispersed first and second polarization components emitted from the polarizing diffraction element are incident on the incident surface.

8. The spectroscopic analysis device according to claim 7, wherein
the polarizing diffraction element has an exit surface from which the diffracted and spectrally dispersed first and second polarization components are emitted, and
the incident surface of the prism and the exit surface of the polarizing diffraction element are close to each other.

9. The spectroscopic analysis device according to claim 7, wherein
the polarizing diffraction element has an exit surface from which the diffracted and spectrally dispersed first and second polarization components are emitted, and
the prism and the polarizing diffraction element are fixed so that a space is formed between the incident surface of the prism and the exit surface of the polarizing diffraction element.

10. The spectroscopic analysis device according to claim 1, wherein
the first polarization component is either a clockwise circularly polarized light component or a counter-clockwise circularly polarized light component, and
the second polarization component is the other of the clockwise circularly polarized light component and the counter-clockwise circularly polarized light component.

11. The spectroscopic analysis device according to claim 1, wherein
the polarizing diffraction element is a transmission polarizing diffraction element having form birefringence or molecular orientation birefringence.

12. The spectroscopic analysis device according to claim 1, wherein
the prism is a planar member of which the shape in the reference plane is quadrangular,
the first exit surface of the prism is a surface including an arbitrary side of the quadrangle, and
the second exit surface of the prism is a surface including another side of the quadrangle.

13. The spectroscopic analysis device according to claim 12, wherein
the prism has an incident surface which is a surface including still another side of the quadrangle, and
the diffracted and spectrally dispersed first and second polarization components emitted from the polarizing diffraction element are incident on the incident surface.

14. The spectroscopic analysis device according to claim 1, wherein
in the imaging element, an image of the first polarization component and an image of the second polarization component are imaged to be offset from each other on an imaging surface of the imaging element.

15. The spectroscopic analysis device according to claim 1, wherein
the processor includes a storage device configured to store a relationship between a position of an image formed on an imaging surface of the imaging element, a wavelength, and a polarization component in advance, and
the processor derives a magnitude of a circularly polarized light dichroism of the sample in the wavelength by performing prescribed computation based on the image of the first polarization component and the image of the second polarization component imaged by the imaging element and the relationship stored in the storage device.

16. The spectroscopic analysis device according to claim 15, wherein
the prescribed computation involves deriving a difference between absorptivities of the sample with respect to the first and second polarization components in the wavelength.

17. The spectroscopic analysis device according to claim 1, wherein
an angle of the first exit surface with respect to the reference plane is −45°, and
an angle of the second exit surface with respect to the reference plane is 45°.

18. The spectroscopic analysis device according to claim 17, wherein
an angle of a first spectral dispersion plane including a light beam obtained by spectrally dispersing the first polarization component using the polarizing diffraction element with respect to the reference plane is a prescribed second angle, an angle of a second spectral dispersion plane including a light beam obtained by spectrally dispersing the second polarization component using the polarizing diffraction element with respect to the reference plane is a prescribed first angle, and the prescribed second angle and the prescribed first angle are values having different signs, and an absolute value of the prescribed second angle is the same as an absolute value of the prescribed first angle.

19. The spectroscopic analysis device according to claim 1, wherein an angle of the first exit surface with respect to the reference plane is an angle having a positive or negative value, and an angle of the second exit surface with respect to the reference plane is an angle having the other of the positive and negative values.

20. The spectroscopic analysis device according to claim 19, wherein an angle of a first spectral dispersion plane including a light beam obtained by spectrally dispersing the first polarization component using the polarizing diffraction element with respect to the reference plane is a prescribed second angle, an angle of a second spectral dispersion plane including a light beam obtained by spectrally dispersing the second polarization component using the polarizing diffraction element with respect to the reference plane is a prescribed first angle, and the prescribed second angle and the prescribed first angle are values having different signs.

* * * * *